2,719,547

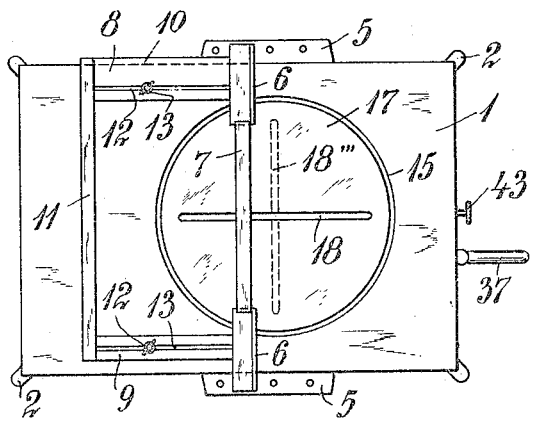

UNIVERSALLY ADJUSTABLE UNDERBENCH SAW

Arne Gjerde, Grefsen, Oslo, Norway

Application January 30, 1953, Serial No. 334,254

Claims priority, application Norway March 1, 1952

4 Claims. (Cl. 143—6)

The invention relates to a motor-driven saw which can be used both for cross cutting and for ripping and also for cutting under any desired angles of inclination in the horizontal as well as in the vertical plane, so that with this saw it is possible to carry out all the various sawing operations which for example are required for building purposes, the saw being at the same time easy to operate and adapted to be manufactured at relatively small costs and with so modest dimensions and small weight that it can easily be transported.

The motor-driven saw according to the invention is of the kind having a circular saw blade placed below a supporting surface for the blank and movable in its own plane towards and away from the same and mounted for angular adjustment together with its driving mechanism, and the characteristic feature primarily consists in that saw blade shaft is angularly adjustable both in the horizontal and the vertical plane by means of separate bearings.

Further features of the invention will appear from the following specification of an embodiment of the motor-driven saw, reference being had to the drawing, in which:

Fig. 1 is a plan view of the saw,

Fig. 2 a vertical longitudinal section,

Fig. 3 an end view seen from the operator's side, and

Fig. 4 illustrates a detail at a somewhat larger scale and viewed from the line IV—IV in Fig. 2.

The stationary frame of the motor-driven saw is in the form of a table having a plane table plate 1 and four legs 2, which near the bottom are stiffened by braces 3 and a cross bar 4. The plate 1, which is of rectangular shape and serves for supporting the blank, can, when necessary, be extended to both sides attaching suitable extension members to brackets 5 carried by the framing of the table plate underneath the edges of the latter. As a backing for the blank there are provided a pair of angular brackets 6, placed in mutual alignment on top of the table on either side and connected with each other by a vertical yoke 7. The brackets 6 are provided with rearwardly extending rails 8 and 9 respectively, one of which 8 has a ledge 10 guided along the edge of the table plate 1, and which are mutually connected at their rear ends by a cross bar 11 and have longitudinal slots 12 permitting a fixation on the table plate in any desired position by means of wing screws 13. When necessary, a bridging board indicated in dash and dot lines at 14 in Fig. 2, can be attached to the brackets 6 if a continuous backing is desired, for example for ripping operations.

The table plate 1 has a large circular opening 15 and is reinforced along the edge of the same on the bottom side by a ring 16. Within the opening 15 there is mounted a disc 17 which is flush with the plate 1 and has a diametric slot 18. The disc 17 is at the periphery supported by the ring 16 through a thrust ball bearing, the upper bearing ring 19 of the latter being attached to the disc 17 and the lower bearing ring 20 being attached to the ring 16 by screws 21. In the ring 19 there is suspended an angle iron frame 22, the latter having at one edge a pair of upwardly projecting arms 23, which at their upper ends carry a pair of pivots 24, journalled in the ring 19 along an aixs coinciding with the diameter along the slot 18. The pivots 24 may conveniently have a sector-shaped cross-section with the apex at the top as shown in Fig. 4, in order that the axis of rotation of the frame 22 shall come as close to the disc 17 as possible.

The frame 22 has at its opposite edge a downwardly projecting arm 25, carrying at the bottom a flat rail 26 which extends in a vertical plane passing through the center of the disc 17 at right angles to the pivots 24 and forms an arc about the same center. By means of a screw 27 the arc 26 can be fixed in desired angular positions within a fork 28 which with a downwardly projecting pivot is rotatably mounted on the cross bar 4 along a vertical axis passing through the center of the opening 15.

A pair of lugs projecting from one end of the angle iron frame 22 carries a pivot 29 extending at a right angle to the axis of the pivots 24. On the pivot 29 is suspended a narrower frame 30, which on its bottom side substantially vertically below the pivot 29 carries a motor 31, which is supplied with current through flexible conductors (not shown) and which through a pulley 32 and belts 33 is connected to a pulley 34 on the shaft of the saw blade 35. The bearing for the saw blade shaft which is parallel to the pivot 29, is attached on top of the mounting frame 30 substantially in the middle of the length of the supporting frame 22 and can by rocking the frame 30 about the pivot 29 be moved up and down within the frame 22 together with the saw blade 35, which is located outside the frame 30 on one side of the same and extends in a common plane with the pivots 24.

At the end remote from the pivot 29 the mounting frame 30 carries an operating lever 36, which is cranked downwards so as to avoid collision with the supporting frame 22 and carries on its free extremity a detachable forwardly projecting handle 37 and a pair of handles 38 and 39 projecting to either side. The lever 36 is guided between a pair of rails 40 which extend downwards from the extremity of the frame 22 in a plane perpendicular to the pivot 29, forming an arc about the latter, and one of which has a slot for the passage of a screw 41, serving for fixing the lever 36 in desired angular positions. From the other rail a screen 42 extends laterally so as to form a protection against contact with the saw blade 35.

It will be understood from the above that by turning the disc 17 it is possible to adjust the saw blade shaft into any desired angular position in the horizontal plane, whereas by turning the frame 22 about its pivots 24 it is possible to adjust the saw blade shaft into different positions in the vertical plane, and that hence it is made possible to cut both longitudinally, transversely and in inclined direction in blanks backed by the brackets 6 and that in all positions the plane of the saw blade will pass through the slot 18 and through a fixed point formed by the intersection of the axis of rotation of the disc 17 and the axis of the pivots 24. Since the latter axis extends just below the disc 17, the slot 18 may be quite narrow, which is of advantage for obtaining clean cuts. In detail the manner of operation will be as follows:

In the position shown, in which the saw blade 35 is in a vertical position and the pivots 24 and hence the slot 18 extend at a right angle to the brackets 6, the motor-driven saw may be used for cross-cutting. For this use the screw 41 is released so that it is possible by means of the handle 37 to swing the blade 35 up and down between the lower position shown and a position in which it projects upwards through the slot 18 as indicated at 35' in Fig. 2. If it is desired to make cuts having a slope in the vertical plane, one may on releasing the screw 27 swing the frame 22 laterally, for example to a position of the arc 26 and the blade 35 as indicated in dash and dot lines at 26", 35" in Fig. 3, whereafter the screw 27 is again tightened and the saw may again be operated by means of the handle 37. If it is desired to cut obliquely in the horizontal plane with the saw blade shaft in a horizontal or sloping position, a screw 43 fixing the bearing ring 19 with respect to the ring 16 is released and, if necessary, the handle 37 is removed in order not to collide with the table legs, whereafter, by using the handle 38 or 39 according to the side to which it is desired to turn, the disc 17 with the fork 28 and the frames 22 and 30 are swung laterally the desired angle and finally the screw 43 is tightened and the saw is operated as before by rocking up and down through the slot 18, although this time by means of the handle 38 or 39 respectively. If the saw is to be used for ripping, the disc 17 is turned until the slot 18 is parallel to the backing 6 as shown in dash and dot lines at 18''' in Fig. 1, and the frame 30 is fixed by means of the screw 41 in a position in which the blade 35 projects a suitable distance above the slot. For this use it will as a rule be practical to use a bridging backing board 14 as mentioned previously. When using the saw as a rip-saw, it will always be possible to cut against the wood grains even with a sloping saw blade shaft because even though the blade can only be made to slope in one direction, the rotation of the disc 17 is unlimited, and with the same side of the blank contacting the backing it is possible to advance the blank from one side of the table or the other as desired.

As it will be apparent, the motor-saw illustrated is of a very compact construction so that it requires little space in the working place and during transport. In order to hold the rotatable disc 17 securely in place during transport and also during the manipulations it may be convenient to provide the upper bearing ring 19 with internal hooks fastened by screws or similar means (not shown) and projecting underneath the lower bearing ring 20.

I claim:

1. A universal underbench saw comprising a table structure which comprises a frame structure and a table plate having a circular opening therein, a rotatable structure supported by said table structure for rotation concentrically to said opening, a disc on said rotatable structure for rotation in said circular opening, a saw blade slot substantially diametrically of said disc, a supporting frame pivotally mounted on said rotatable structure, the pivot axis for said supporting frame substantially coinciding with said slot, a mounting frame pivotally mounted from said supporting frame, the pivot axis for said mounting frame being substantially at right angles to said slot, said mounting frame being capable of free movement about its pivot axis, a saw blade rotatably mounted on said mounting frame, the axis of said saw blade being substantially parallel to the pivot axis of said mounting frame, an electric motor mounted on said mounting frame, said saw blade being drivingly connected to said electric motor, means rotatably mounted on said frame structure and adjustably receiving a depending portion of said supporting frame to selectively position said supporting frame, and means on said supporting frame to selectively position said mounting frame.

2. A universal underbench saw comprising a table structure which comprises a frame structure and a table plate having a circular opening therein, a rotatable structure supported by said table structure for rotation concentrically to said opening, a disc on said rotatable structure for rotation in said circular opening, a substantially diametrical saw blade slot in said disc, a supporting frame pivotally mounted from said rotatable structure, the pivot axis for said supporting frame substantially coinciding with said saw blade slot, a mounting frame pivotally mounted on said supporting frame, the pivot axis for said mounting frame being substantially perpendicular to said saw blade slot, said mounting frame being capable of free movement about its pivot axis, a saw blade rotatably mounted on said mounting frame, the axis of said saw blade being substantially parallel to the mounting frame axis, an electric motor mounted on said mounting frame, said saw blade being drivingly connected to said electric motor, an operating lever extending from said mounting frame, guide rails on said supporting frame to receive said lever, means on said rails to adjustably fix said lever in position, said guide rails being in a plane substantially perpendicular to the pivot axis of the mounting frame, and means rotatably mounted on said frame structure for rotation coaxially with said disc for adjustably engaging and selectively positioning said supporting frame.

3. A universal underbench saw comprising a table structure which comprises a frame structure and a table plate having a circular opening therein, a rotatable structure supported by said table structure for rotation concentrically to said opening, a disc on said rotatable structure for rotation in said circular opening, a substantially diametrical saw blade slot in said disc, a supporting frame pivotally mounted from said rotatable structure, the pivot axis of said supporting frame substantially coinciding with said saw blade slot, a mounting frame pivotally mounted from said supporting frame, the pivot axis of said mounting frame being substantially at right angles to said saw blade slot, said mounting frame being capable of free movement about its pivot axis, a saw blade rotatably mounted on said mounting frame, the axis of said saw blade being substantially parallel to the mounting frame axis, an electric motor mounted on said mounting frame, said saw blade being drivingly connected to said electric motor, a first arcuate portion extending downwardly from said supporting frame, said first arcuate portion being in a plane substantially perpendicular to the pivot axis of said mounting frame and extending in a circular arc, means to adjustably position said mounting frame on said first arcuate portion, a second arcuate portion on said supporting frame and extending in a circular arc, said second arcuate portion being in a plane substantially parallel to the pivot axis of said mounting frame, and means rotatably mounted on said frame structure beneath said table plate for adjustably engaging and positioning said second arcuate portion.

4. A universal underbench saw as claimed in claim 3 with said last mentioned means comprising a fork rotatably mounted on said frame structure in the lower part thereof and having its rotational axis coinciding with that of said rotational structure and a releasable connection on said fork receiving a portion of said supporting frame within said rotatable fork for positioning said frame in predetermined tilting positions.

References Cited in the file of this patent

UNITED STATES PATENTS

| | | |
|---|---|---|
| 283,546 | Weston | Aug. 21, 1883 |
| 1,584,086 | Fonda | May 11, 1926 |
| 1,679,103 | Thomson | July 31, 1928 |
| 2,208,582 | Hollister | July 23, 1940 |
| 2,292,872 | Eastman | Aug. 11, 1942 |
| 2,488,077 | Buday | Nov. 15, 1949 |
| 2,513,873 | Horton | July 4, 1950 |